United States Patent
Pachkov et al.

(10) Patent No.: US 11,979,230 B1
(45) Date of Patent: *May 7, 2024

(54) METHOD AND SYSTEM FOR TRANSMITTING DATA OVER MULTIPLE PATHS

(71) Applicant: Parallels International GmbH, Schaffhausen (CH)

(72) Inventors: Sergey Pachkov, Moscow (RU); Lyubov Kulakova, Moscow (RU); Serguei Beloussov, Singapore (SG); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 300 days.

This patent is subject to a terminal disclaimer.

(21) Appl. No.: 16/948,772

(22) Filed: Sep. 30, 2020

Related U.S. Application Data

(63) Continuation of application No. 16/142,164, filed on Sep. 26, 2018, now Pat. No. 10,812,220.

(51) Int. Cl.
*H04L 1/00* (2006.01)
*H04W 24/02* (2009.01)
*H04W 28/04* (2009.01)

(52) U.S. Cl.
CPC ............ *H04L 1/0045* (2013.01); *H04W 24/02* (2013.01); *H04W 28/04* (2013.01)

(58) Field of Classification Search
CPC ....... H04L 69/16; H04L 69/32; H04L 69/326; H04L 67/14; H04L 1/0045; H04W 24/02; H04W 28/04

See application file for complete search history.

(56) References Cited

U.S. PATENT DOCUMENTS

| | | | |
|---|---|---|---|
| 6,493,342 B1 | 12/2002 | Breslow et al. | |
| 7,929,422 B2 * | 4/2011 | Ramalho | H04L 67/02 370/219 |
| 9,141,564 B1 | 9/2015 | Wieland | |
| 9,471,533 B1 * | 10/2016 | Roth | H04L 67/5682 |
| 10,031,682 B1 * | 7/2018 | George | G06F 3/0647 |
| 10,129,319 B2 * | 11/2018 | Eriksson | H04L 65/1069 |
| 10,356,838 B2 | 7/2019 | Salkintzis | |
| 10,375,192 B1 * | 8/2019 | Lepeska | H04L 67/02 |
| 10,771,849 B2 * | 9/2020 | Krebs | G06F 17/3002 |

(Continued)

*Primary Examiner* — Hoang-Chuong Q Vu
(74) *Attorney, Agent, or Firm* — Rosenberg, Klein & Lee

(57) ABSTRACT

Disclosed herein are systems and method for transmitting data from a sending device to a receiving device. In one aspect, an exemplary method comprises, receiving, by a first logical object created for the sending device, a request for a connection to the receiving device from an application, establishing, by a second logical object created for the sending device, a bidirectional connection between each pair of a third logical object created for the sending device and a third logical object created for the receiving device, pre-processing, by the first logical object created for the sending device, data received from the application, selecting, by the second logical object created for the sending device, one or more established bidirectional connections for transmitting the pre-processed data, and sending, by the first logical object created for the sending device, the pre-processed data, to the receiving device via the selected connections.

13 Claims, 5 Drawing Sheets

(56) References Cited

U.S. PATENT DOCUMENTS

| | | |
|---|---|---|
| 2005/0091357 A1 | 4/2005 | Krantz et al. |
| 2005/0114315 A1* | 5/2005 | Tanner .................... H04L 41/22 |
| 2006/0209821 A1 | 9/2006 | Jung et al. |
| 2008/0040489 A1 | 2/2008 | Hockett et al. |
| 2011/0225284 A1 | 9/2011 | Savolainen |
| 2012/0131223 A1 | 5/2012 | Watson et al. |
| 2012/0157038 A1 | 6/2012 | Menezes et al. |
| 2013/0094398 A1 | 4/2013 | Das et al. |
| 2014/0201523 A1 | 7/2014 | Sato |
| 2015/0304916 A1* | 10/2015 | Wang .................... H04W 16/32 |
| | | 455/436 |
| 2016/0021604 A1 | 1/2016 | Weksler et al. |
| 2017/0180265 A1* | 6/2017 | Underwood ............ H04L 47/34 |
| 2017/0187621 A1 | 6/2017 | Shalev et al. |
| 2017/0303332 A1* | 10/2017 | Yuan .................... H04W 76/16 |
| 2018/0124216 A1* | 5/2018 | Pope ........................ H04L 49/30 |
| 2018/0176858 A1 | 6/2018 | Wang et al. |
| 2019/0098539 A1* | 3/2019 | Zhang ............... H04W 36/0033 |
| 2019/0104057 A1 | 4/2019 | Goel et al. |
| 2020/0045519 A1* | 2/2020 | Raleigh ................ H04M 15/80 |

* cited by examiner

METHOD AND SYSTEM FOR TRANSMITTING DATA OVER MULTIPLE PATHS

CROSS REFERENCE TO RELATED APPLICATIONS

This application is a continuation of U.S. patent application Ser. No. 16/142,164, filed Sep. 26, 2018. The present application is related to U.S. patent application Ser. No. 15/620,956, filed on Jun. 13, 2017, which is incorporated herein by reference.

FIELD OF TECHNOLOGY

The present disclosure relates to the field of data transmission and reception, and, more specifically, to systems and methods for transmitting data over multiple paths through any number of networks.

BACKGROUND

Modern mobile communication devices, e.g., smartphones, are able to transmit and receive data via a variety of access links established over different types of networks, e.g., cellular networks, Wi-Fi networks, etc. However, applications running on a mobile device are typically configured to send all its data on the same access link. For example, if a device is attached to a 4G network, a Wi-Fi network, and a wire-based network simultaneously, data for the application running on that device will typically use either the link to the 4G network, the Wi-Fi network, or the wire-based network, but not to a plurality of the networks to which the device is connected. The amount of traffic on each type of network evolves overtime, which sometimes leads to inefficiency in usage of network resources by the devices connected to these networks. For example, one network may be operating at capacity while another network may be underutilized. The overutilization of networks may cause transmission delays and degradation in quality of transmissions on that network.

Therefore, there is a need to improve usage of network transmission resources.

SUMMARY

Aspects of the disclosure relate to the field of transmitting data over multiple paths.

In one exemplary aspect, a method for transmitting data from the sending device to a receiving device is implemented in a sending device comprising a processor, the method comprising: receiving, by a first logical object created for the sending device, a request for a connection to the receiving device from an application supported by the sending device, the first logical object being created for the application, establishing, by a second logical object created for the sending device, a bidirectional connection between each pair of a third logical object created for the sending device and a third logical object created for the receiving device, pre-processing, by the first logical object created for the sending device, data received from the application, selecting, by the second logical object created for the sending device, one or more established bidirectional connections for transmitting the pre-processed data to a receiving device, and sending, by the first logical object created for the sending device, the pre-processed data, to the receiving device via the selected one or more established bidirectional connections.

According to one aspect of the disclosure, a system is provided for transmitting data from a sending device to a receiving device, the system comprising at least one processor configured to: by a first logical object created for the sending device, receive a request for a connection to the receiving device from an application supported by the sending device, the first logical object being created for the application, by a second logical object created for the sending device, establish a bidirectional connection between each pair of a third logical object created for the sending device and a third logical object created for the receiving device, by the first logical object created for the sending device, pre-process data received from the application, by the second logical object created for the sending device, select one or more established bidirectional connections for transmitting the pre-processed data to a receiving device, and by the first logical object created for the sending device, send the pre-processed data to the receiving device via the selected one or more established bidirectional connections.

In one exemplary aspect, a non-transitory computer-readable medium is provided storing a set of executable instructions thereon for transmitting data from a sending device to a receiving device over multiple paths, including instructions for receiving, by a first logical object created for the sending device, a request for a connection to the receiving device from an application supported by the sending device, the first logical object being created for the application, establishing, by a second logical object created for the sending device, a bidirectional connection between each pair of a third logical object created for the sending device and a third logical object created for the receiving device, pre-processing, by the first logical object created for the sending device, data received from the application, selecting, by the second logical object created for the sending device, one or more established bidirectional connections for transmitting the pre-processed data to a receiving device, and sending, by the first logical object created for the sending device, the pre-processed data, to the receiving device via the selected one or more established bidirectional connections.

In one aspect, the establishing of the bidirectional connection comprises: initiating a negotiation with a second logical object of the receiving device to obtain an assignment of Source Sequence Numbers (SSNs), the pre-processed data being transmitted using SSNs assigned by the second logical object of the receiving device, and each first logical object of the sending device being assigned a unique set of SSNs.

In one aspect, a processor of the sending device, creates one or more first logical objects, the second logical object, and one or more third logical objects, wherein, each first logical object of the one or more first logical objects created for the sending device is created for a particular application of one or more applications supported by the sending device, each third logical object created for the sending device is created for a particular network interface component of one or more network interface components of the sending device, and the second logical object created for the sending device comprises all of the third logical objects created for the sending device.

In one aspect, the pre-processing by the first logical object created for the sending device comprises: receiving the data from the application associated with the particular first logical object, packetizing the received data to obtain data packets, encrypting the data packets, and applying a data recovery mechanism on the encrypted data packets to obtain recoverable data packets. In one aspect, the recoverable data packets comprise a sequence of User Datagram Protocol (UDP) data packets, the sequence comprising the encrypted data packets and packets of the recovery mechanism. In one aspect, the data recovery mechanism applies a Forward Error Correction (FEC) mechanism on the encrypted data packets to obtain the recoverable data packets, the packets of the recovery mechanism comprising FEC data.

In one aspect, a processor of the receiving device, creates one or more first logical objects, a second logical object, and one or more third logical objects, wherein, each first logical object of the one or more first logical objects created for the receiving device is created for a particular application of one or more applications supported by the receiving device, each third logical object created for the receiving device is for a particular network interface component of one or more network interface components of the receiving device, and the second logical object created for the receiving device comprises all of the third logical objects created for the receiving device.

In one aspect, a first logical object of the one or more first logical objects created for the receiving device processes the data received from the first logical object of the sending device, wherein the processing of the received data comprises: recovering data packets when at least one data packet is lost, decrypting the received data when the received data packets are encrypted by the first logical object of the sending device, and providing the decrypted data packets to the application associated with the first logical object of the receiving device.

In one aspect, the first logical object of the receiving device receives the data from the first logical object of the sending device through a second logical object of the receiving device, and the second logical object of the receiving device identifies data flows directed to the first logical object based on Source Sequence Numbers (SSNs), the SSNs being assigned by the second logical object of the receiving device.

The transmitting of the data from the sending device to the receiving device over multiple paths in accordance with the teachings of the present disclosure allows a more efficient use of network resources. As data reaches the receiving device via the various paths, the user experience is improved.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for transmitting data over multiple paths through any number of networks. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
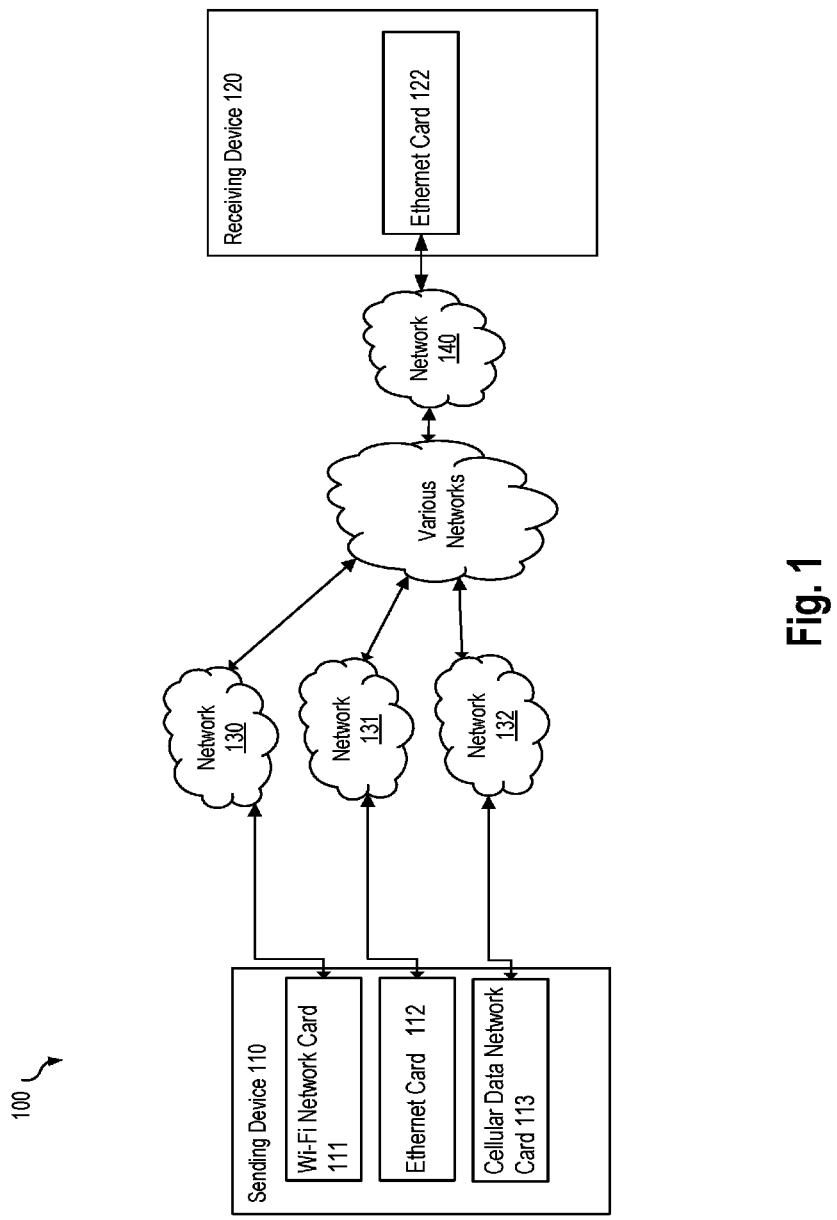
FIG. 1 is a block diagram illustrating an exemplary network for transmitting data from a sending device to a receiving device over multiple paths in accordance with aspects of the present disclosure

FIG. 1 is a block diagram illustrating an exemplary network 100 for transmitting data from a sending device to a receiving device over multiple paths in accordance with aspects of the present disclosure. The network 100 comprises a device 110 communicating with a device 120 for transmission of data. Device 110 includes a Wi-Fi network card 111, an Ethernet card 112 and cellular data network card 113. Device 120 includes an Ethernet card 122. Device 110 is attached to networks 130, 131 and 132 via network cards 111, 112 and 113, respectively. Similarly, device 120 is attached to network 140 via network card 122.

The sending device 110 may transmit a data stream for an application (e.g., an application for audio, video, message, etc.) as a sequence of data packets. When a single path is established for the data transmission over a selected one of the networks 130-132, the data transmission may either fail to meet the expectations of the user or become unreliable.

In one aspect, a network, e.g., 130, 131, 132 or 140, of the present disclosure may be a private or a public network. In one aspect, the sending device 110 or receiving device 120 may attach to any number of a plurality of networks. For example, the device may attach to a Long Term Evolution (LTE) network and to a Wireless Fidelity (Wi-Fi) network. For each device, all components used for attachment to a network support Internet Protocol (IP).

In one aspect, the sending device 110 comprises a client device and the receiver device 120 comprises a server device. In one aspect, the sending device 110 comprises a server device and the receiving device 120 comprises a client device. In one aspect, the sending device 110 or receiving device 120 comprises a user endpoint device, e.g., a smartphone, a computer, and the like. For example, the communication may be established for a client-server communication, for communication between two smartphones, for communication between a smartphone and a computer, and so on. In addition, the communication may be initiated by either the sending or receiving device.

Figure 2:
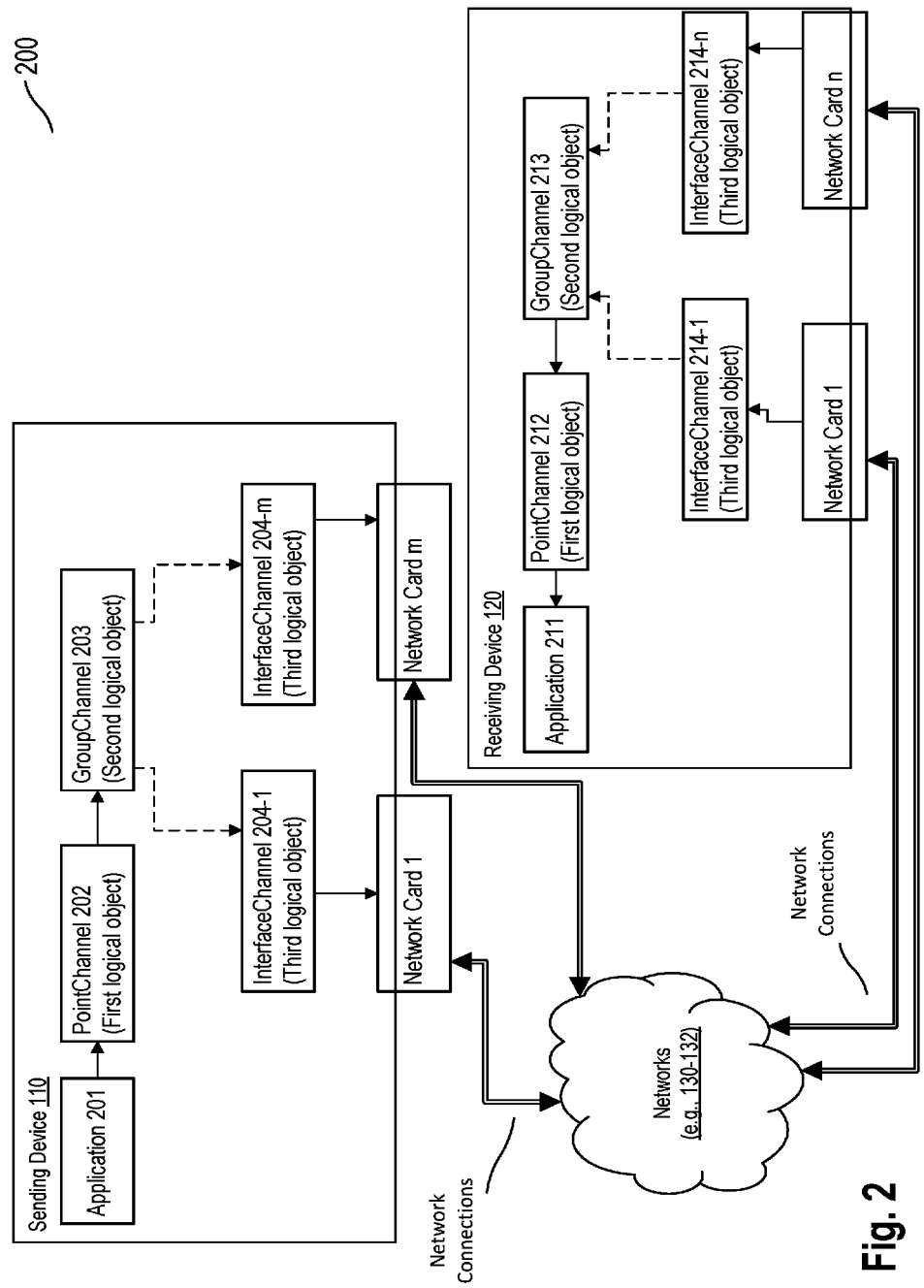
FIG. 2 is a block diagram illustrating an exemplary network with logical objects used for transmission of data over multiple paths.

In one aspect of the present disclosure, for each of the sending device 110 and the receiving device 120, logical objects are created for performing various tasks needed for transmission of the data in accordance with the disclosure. FIG. 2 is a block diagram illustrating an exemplary network 200 with logical objects used for transmission of data over multiple paths.

The network 200 includes a sending device 110 and a receiving device 120. Device 110 is communicating via m interface cards and device 120 is communicating via n interface cards. For each application supported by device 110, a PointChannel logical object is created. For example, PointChannel logical object 202 is created for application 201. GroupChannel logical object 203 serves any number of PointChannel logical objects created for device 110. InterfaceChannel logical objects 204-1 through 204-m are created for attaching to m different networks. Similarly, for each application supported by device 120, a PointChannel logical object is created. For example, PointChannel logical object 212 is created for application 211. GroupChannel logical object 213 serves any number of PointChannel logical objects created for device 120. InterfaceChannel logical objects 214-1 through 214-n are created for attaching to n different networks.

In order to clearly illustrate the teachings of the present disclosure, definitions and tasks of the various types of logical objects are first provided. Each device (i.e., receiving or sending) has at least three types of logical objects. The first type of logical object may be referred to as a "first logical object" or as a "PointChannel logical object." The second type of logical object may be referred to as a "second logical object" or as a "GroupChannel logical object." The third type of logical object may be referred to as a "third logical object" or as an "InterfaceChannel logical object." A device may further use a fourth type of logical object also referred to as an "InterfaceMonitor logical object", as described below.

The first logical object is created for directly communicating with an application supported by the device on which the PointChannel logical object is instantiated and for data transfer to and from the application. The first logical object is also tasked with packetizing, encryption/decryption (e.g., using TLS/DTLS), adding data recovery packets, and recovering data packets lost during transmission.

In one aspect, data packets are recovered using a Forward Error Correction (FEC) data recovery mechanism. The encryption, decryption, FEC encoding and decoding are performed in accordance with standard techniques. For example, User Datagram Protocol (UDP) Transport Extension Protocol uses the FEC mechanism for recovery from packet losses. An FEC Packet is added to the data stream after processing a block of m Source (data) Packets. For example, a first stream of m data packets may be followed by FEC packets computed on the first stream of m source packets, a second stream of m data packets may be followed by FEC packets computed on the second stream of m data packets, and so on, in sequence. Each FEC Packet carries redundant information regarding the data packets on which it is computed. This information can be used in case one of the m data packets on which it is computed is lost and needs to be recovered.

The data transfer performed by the first logical object may be for an application that requires a stream based transmission (e.g., using UDP-R/L protocol) or for a message based transmission using a standard open interface specification for messages (e.g., a Remote Desk Top Protocol: UDP Transport Extension published by Microsoft (MS-RDPEUDP)). The data transfer may also be for a service that provides either a guaranteed or a non-guaranteed delivery of the data. Based on whether the application is the source or the recipient of the data, the PointChannel logical object performs either a processing prior to transmission to the other device (i.e., pre-processing), or a processing after the reception from the other device (i.e., post-processing). In one example, data received from another device and directed towards the application is processed by the PointChannel logical object before being forwarded to the Application. In another example, data sourced by the application of the device and directed to another device is pre-processed by the PointChannel logical object (i.e., by the first logical object of the sending device).

In one aspect of the present disclosure, the application receives data exclusively from the PointChannel logical object associated with the application. In other words, an application of the receiving device receives data exclusively from the first logical object of the receiving device. The PointChannel logical object of the receiving device uses a unique Source IDentification (SID) to determine the source of the data. The SID is a number that has an expandable bit depth of up to 32 bits. For example, at the receiver side of the transmission, a first logical object of the sending device is uniquely identifiable. In other words, the PointChannel logical object of the device from which the data is received is uniquely identifiable. Section A describes an example of a method for assigning sequence numbers to source packets. The assignment is performed such that data packets received from two applications of a sending device are routed to respective applications at the receiver side.

In one aspect, the PointChannel logical object is also tasked with specifying an initial set of connections. For example, the PointChannel logical object may create a control object for controlling GroupChannels. Then, the control object may specify the initial set of connections the GroupChannel logical object selects when the connection is initially established. In specifying the initial set of connections, the PointChannel logical object uses network addresses and port numbers that are already available for the connection. The PointChannel logical object may use any number of different pairs of source and destination address ports.

The second logical object is created for selecting a method and a direction of sending messages with data. In order to select the method of sending the data, the second logical object generates and maintains a list of third type of logical objects, each object being for a given communications channel (e.g., LTE, Wi-Fi, etc.). For each third logical object, the second logical object determines values of one or more performance parameters. In one aspect, the performance parameters for the third logical object comprises parameters for tracking, for the corresponding communications channel: connection possibilities, response times, data transfer rates, data loss rates, and the like. The second logical object may then sort the third logical objects based on the values of the various performance parameters. The selection of a method for transmission of the data may then be based on the sorted list of the third logical objects. It is noted that the second logical object may select any number of third logical objects for transmission of the data—thereby enabling the transmission to occur over multiple paths.

In one aspect, the selection may further be based on one or more parameters associated with the data, i.e., parameters associated with the data packets. In one aspect, the one or more parameters associated with the data packets comprise at least one of: a Quality of Service (QoS) parameter, a type of service associated with the data packets (e.g., video, audio, etc.), a priority associated with the data packets), etc.

The second logical object of the receiving device 120 identifies data flows directed to the first logical object of the receiving device 120 based on Source Sequence Numbers (SSNs). The SSNs are assigned by the second logical object of the receiving device 120 prior to the data transfer from the source device.

In one aspect, the second logical object monitors the list of logical objects of the third type to determine when network components are added or removed. For example, for each third logical object in the list, the second logical object may run a monitoring process to determine whether the logical object remains on the list. In addition, the second logical object may issue a command to determine if another third logical object is added to the list.

In one aspect, the monitoring of the list of third logical objects may be performed directly by the second logical object. In another aspect, the monitoring of the list of third logical objects may be performed via a fourth type of logical object. The fourth type of logical object may be referred to as "fourth logical object" or an "InterfaceMonitor" logical object. The fourth logical object may interact with an operating system of a device to: update information about existing network components connected to the network, create an appropriate third logical object for each enabled network component that has an IP address, and add the third logical object that is created to the second logical object. When the fourth logical object is performing the tasks described above, the second logical object may issue commands to the fourth logical object—thereby enabling the system to readily determine when network components are removed or added. In other words, the second logical object may run parallel command flows to invoke the monitoring and reporting of additions and removals of network components.

The third logical object is created for controlling and measuring connection parameters, interacting with an operating system Application Program Interface (API) of a device on which the third logical object is instantiated, and sending and receiving packets, e.g., data packets. In one aspect, the measurement of the connection parameters by the third (InterfaceChannel) logical object comprises measuring one or more of: response times, instant data transfer times, number of packets lost for a selected network component during a connection with another device. The other device may be either a device to which data is being transmitted or a device from which data is being received. In one aspect, the measuring of the connection parameters is performed using both the destination and resolve addresses. The third logical object also creates a UDP socket on a dedicated network component and logically associating the UDP socket with an address, e.g., a destination address to which data is being transmitted.

In one aspect of the present disclosure, for each network to which a device is attached, an interface channel (InterfaceChannel) logical object is created. For instance, suppose a device is attached to an LTE network and a Wi-Fi network. Then, two InterfaceChannel logical objects are created—one for use to access the LTE network and another to access the Wi-Fi network. Therefore, one or more PointChannel logical objects, a GroupChannel logical object, and one or more InterfaceChannel logical objects are created for the sending device 110. Each PointChannel logical object is created for a particular application supported by the sending device 110. Each InterfaceChannel logical object is created for a particular network interface component (card) of one or more network interface components of the sending device 110. Then, a GroupChannel logical object that comprises all of the InterfaceChannel logical objects created for the sending device 110 is created. Similarly, one or more PointChannel logical objects, a GroupChannel logical object, and one or more InterfaceChannel logical objects are created for the receiving device 120.

In one aspect, the sending device 110 or receiving device 120 supports any number of communications channels, e.g, LTE, 3G, etc. In one aspect, the types of communications channels supported by the sending device 110 and receiving device 120 are independent of each other. For example, the sending device 110 may support m communications channels while the receiving device 120 supports n communications channels, where m and n are independent integers. For instance, the m communications channels may comprise: a first communications channel established over a Wi-Fi network, a second communications channel established over an LTE network of a first service provider, and a third communications channel established over an LTE network of a second service provider. Similarly, the n communications channels may comprise a communications channel established over an LTE network of a third service provider. As such, the service providers of the sending device 110 and the receiving device 120 may be the same or different, and/or may use different standards. For example, the sending device 110 may use a GSM carrier while the receiving device 120 uses a CDMA carrier. In other words, the sending device 110 and the receiving device 120 independently reach various access networks.

Returning to FIG. 2, when a connection request is received from an application of the sending device 110, a bidirectional connection is established between each pair of an InterfaceChannel logical object created for the sending device 110 and an InterfaceChannel logical object created for the receiving device 120. For example, if both devices have two InterfaceChannel logical objects—one for accessing an LTE network and another for accessing a Wi-Fi network (e.g., m=n=2), four bidirectional connections are established. In other words, a given bidirectional connection is established between a network interface logical object of the sending device 110 and a network interface logical object of the receiving device 120. A path of the multiple paths may be established for enabling transmission via: an InterfaceChannel logical object of the sending device 110 used for accessing an LTE network to an InterfaceChannel logical object of the receiving device 120 used for accessing a Wi-Fi network; an InterfaceChannel logical object of the sending device 110 used for accessing an LTE network to an InterfaceChannel logical object of the receiving device 120 used for accessing an LTE network; an InterfaceChannel logical object of the sending device 110 used for accessing a Wi-Fi network to an InterfaceChannel logical object of the receiving device 120 used for accessing a Wi-Fi network; and an InterfaceChannel logical object of the sending device 110 used for accessing a Wi-Fi network to an InterfaceChannel logical object of the receiving device 120 used for accessing an LTE network.

Note that three InterfaceChannel logical objects are created for device 110 and only one InterfaceChannel logical object is created for device 120. That is, m=3 and n=1 for the given example illustrated in FIG. 2. Thus, three paths are established between devices 110 and 120. The first path traverses the interface card 111, network 130, network 140 and interface card 122. The second path traverses the interface card 112, network 131, network 140 and interface card 122. The third path traverses the interface card 113, network 132, network 140 and interface card 122. Note that there may be any number of other networks between the networks 130-132 and the network 140 (not shown).

Figure 3:
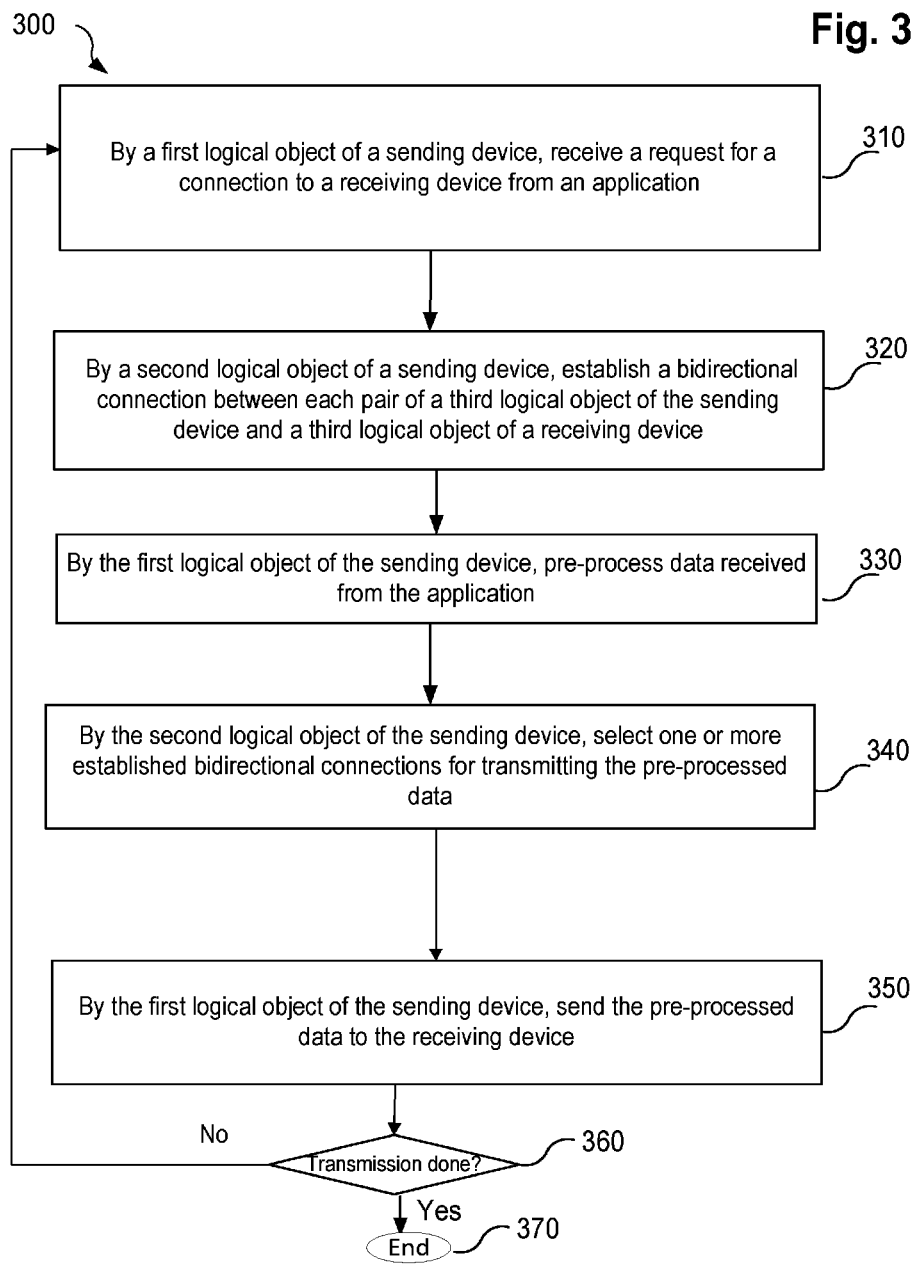
FIG. 3 is a flow diagram illustrating an exemplary method of transmitting data from a sending device to a receiving device in accordance with aspects of the present disclosure.

FIG. 3 is a flow diagram illustrating an exemplary method 300 of transmitting data from a sending device 110 to a receiving device 120 in accordance with aspects of the present disclosure. The method of FIG. 3 may be carried out with the aid of the system described in FIGS. 1-2.

In step 310, a first logical object created for a sending device 110 receives a request for a connection to a receiving device 120 from an application supported by the sending device 110. The first logical object that receives the request for the connection is created for the application from which the request is received. In other words, the first logical object is associated with a specific application from which the connection request is received.

In one aspect, the hardware processors of the sending and receiving devices 110 and 120, respectively, create various logical objects prior to the request for the connection being received from the application. If the request is received before the creation of the various logical objects, the objects may be created upon the reception of the request.

In one aspect, a hardware processor of the sending device 110 creates one or more first logical objects, the second logical object and one or more third logical objects for the sending device 110. Each first logical object of the one or more first logical objects created for the sending device 110 is created for a particular application of one or more applications supported by the sending device 110, each third logical object created for the sending device 110 is created for a particular network interface component of one or more network interface components of the sending device 110, and the second logical object created for the sending device 110 comprises all of the third logical objects created for the sending device 110.

In one aspect, a hardware processor of the receiving device 120 creates one or more first logical objects, a second logical object, and one or more third logical objects for the receiving device 120. Each first logical object of the one or more first logical objects created for the receiving device 120 is created for a particular application of one or more applications supported by the receiving device 120, each third logical object created for the receiving device 120 is for a particular network interface component of one or more network interface components of the receiving device 120, and the second logical object created for the receiving device 120 comprises all of the third logical objects created for the receiving device 120.

In one aspect, a number of third logical objects created for the sending device 110 and a number of third logical objects created for the receiving device 120 are independent of each other.

In step 320, a second logical object created for the sending device 110 establishes a bidirectional connection between each pair of a third logical object created for the sending device 110 and a third logical object created for the receiving device 120.

In one aspect, the bidirectional connection is established over one or more: cellular data networks, Wi-Fi networks, and wired Ethernet networks.

In one aspect, the establishing of the bidirectional connection comprises: initiating a negotiation with a second logical object of the receiving device 120 to obtain an assignment of Source Sequence Numbers (SSNs). The pre-processed data is transmitted using SSNs assigned by the second logical object of the receiving device 120 and each first logical object of the sending device 110 is assigned a unique set of SSNs.

In step 330, the first logical object created for the sending device 110 pre-processes data received from the application.

In one aspect, the pre-processing by the first logical object created for the sending device 110 comprises: receiving the data from the application associated with the particular first logical object, packetizing the received data to obtain data packets, encrypting the data packets, and applying a data recovery mechanism on the encrypted data packets to obtain recoverable data packets. The recoverable data packets comprise a sequence of User Datagram Protocol (UDP) data packets, wherein the sequence includes the encrypted data packets and packets of the recovery mechanism.

In one aspect, the data recovery mechanism applies a Forward Error Correction (FEC) mechanism on the encrypted data packets to obtain the recoverable data packets, wherein the packets of the recovery mechanism include FEC data.

In step 340, the second logical object created for the sending device 110 selects one or more established bidirectional connections for transmitting the pre-processed data to a receiving device 120.

In step 350, the first logical object created for the sending device 110 sends the pre-processed data to the receiving device 120 via the selected one or more established bidirectional connections. The method then proceeds to step 360 to determine whether the transmission is completed. If the transmission is completed, the method proceeds to step 470 to end the process. Otherwise, the method returns to step 310 to continue processing other requests.

In one aspect, a first logical object of the one or more first logical objects created for the receiving device 120 processes the data received from the first logical object of the sending device 110. In other words, the data transmitted in step 350 by the sending device 110 is processed upon reception by the first logical object of the receiving device 120.

Figure 4:
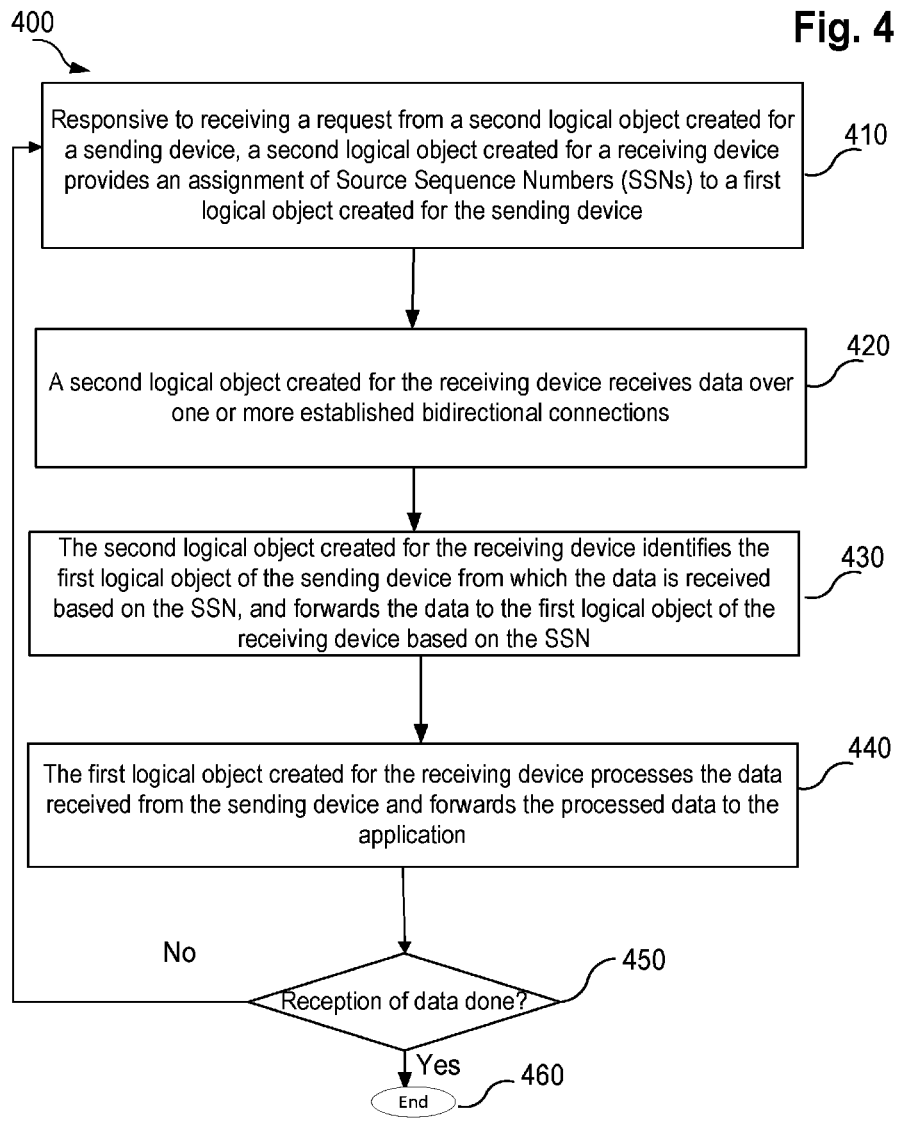
FIG. 4 is a flow diagram illustrating an exemplary method of receiving data by a receiving device from a sending device in accordance with aspects of the present disclosure.

FIG. 4 is a flow diagram illustrating an exemplary method 400 of receiving data by a receiving device 120 from a sending device 110 in accordance with aspects of the present disclosure. The method of FIG. 4 may be carried out with the aid of the system described in FIGS. 1-2.

In step 410, responsive to receiving a request from a second logical object created for a sending device 110, a second logical object created for a receiving device 120 provides an assignment of Source Sequence Numbers (SSNs) to a first logical object created for the sending device 110. Subsequently, the data is received using SSNs assigned by the second logical object of the receiving device 120. In one exemplary aspect, the SSNs may be assigned to Source Packets and used for flow separation as described below.

To separate data packets received by a GroupChannel logical object of a receiving device 120 (sent by two different applications through a same GroupChannel logical object of a sending device 110) the receiving device 120 uses a flow separation algorithm. The flow separation algorithm is based on the separation of the SSNs. Note that two different PointChannel logical objects are created for two applications. However, only one GroupChannel logical object is created. Therefore, the flow separation algorithm allows issuing (i.e., assigning) unique starting SSNs for data transfers from the two PointChannel logical objects. For example, unique starting SSNs are assigned for the PointChannel logical object of the first application and the PointChannel logical object of the second application. The GroupChannel logical object of the receiver device 120 divides the received data based on the assigned SSN. Namely the SSN is used to divide the data between the two PointChannel logical objects of the receiver device 120. That is, PointChannel logical objects are created for the first and second applications, and the SSN is used to divide the received data.

SSN is determined by the GroupChannel logical object of the receiving device 120, which coordinates the starting numbers between sources. For example, suppose there are two applications, named A1 and A2, from which the data may be received. The starting numbers for the two sources may be assigned from the range 0 to $(2^{32})-1=4294967295$. The minimum interval between SSNs is the number 1048575, which is a composite number composed of the prime numbers 3, 5, 11, 31 and 41. (e.g., 1048575=3.5.5.11.31.41). The minimum interval allows $2^{12}$ (4096) intervals within the range 0 to $(2^{32})-1=4294967295$. The SSN numbers are assigned so that cross numbers are excluded. During transmission, the assigned SSN may start approaching the lowest minimum interval. In which case, a new agreement on SSN is executed. The requirement of the new SSN is set to the PointChannel logical object that has transferred the least amount of data.

In addition, if the data transfer is terminated for a time duration equal to or greater than three seconds, the application that allowed the termination of data transfer must adjust the SSN, i.e., new SSNs may be assigned for data transfers interrupted for durations greater than or equal to three seconds. The adjustment of the SSN is done by sending a SYN (synchronization) packet to every port on the server, as if to initiate a three-way handshake. If the server responds with a SYN/ACK (synchronization acknowledged) packet from a particular port, it means the port is open.

It is noted that other methods may be used for flow separation. In other words, the example described above to enable the flow separation is not intended to limit implementation. Those skilled in the art may use other similar algorithms to identify an appropriate application to which data for a flow is to be directed.

In one aspect, the first logical object of the receiving device 120 receives the data from the first logical object of the sending device 110 through a second logical object of the receiving device 120. The second logical object of the receiving device 120 identifies data flows directed to the first logical object of the receiving device 120 based on Source Sequence Numbers (SSNs). The SSNs are assigned by the second logical object of the receiving device 120 prior to the reception of the data.

In step 420, a second logical object created for the receiving device 120 receives data over one or more established bidirectional connections between each pair of a third logical object created for the sending device 110 and a third logical object created for the receiving device 120.

In step 430, the second logical object created for the receiving device 120 identifies the first logical object of the sending device 110 from which the data is received based on the SSN, and forwards the data to the first logical object of the receiving device 120 based on the SSN.

In step 440, the first logical object created for the receiving device 120 processes the data received from the sending device 110 and forwards the processed data to the application. In other words, the data transmitted in step 350 by the sending device 110 is processed upon reception by the first logical object of the receiving device 120 and forwarded to the appropriate application.

In one aspect, the processing of the received data comprises: recovering data packets when at least one data packet is lost, decrypting the received data when the received data packets are encrypted by the first logical object of the sending device 110, and providing the decrypted data packets to the application associated with the first logical object of the receiving device 120.

The method then proceeds to step 450 to determine whether the data reception is completed. If the reception is completed, the method proceeds to step 460 to end the process. Otherwise, the method returns to step 410.

It is noted that a device is referred to as a receiving device 120 or as a sending device 110 based on the direction data is being transferred. However, the device typically performs both functions. For example, a computer, a smartphone, a tablet, etc. receives and sends data simultaneously. Therefore, the above description is not intended to limit a device to be used only for transmitting or receiving. Clearly, the communication is bidirectional and the device serves both directions of transmission.

Figure 5:
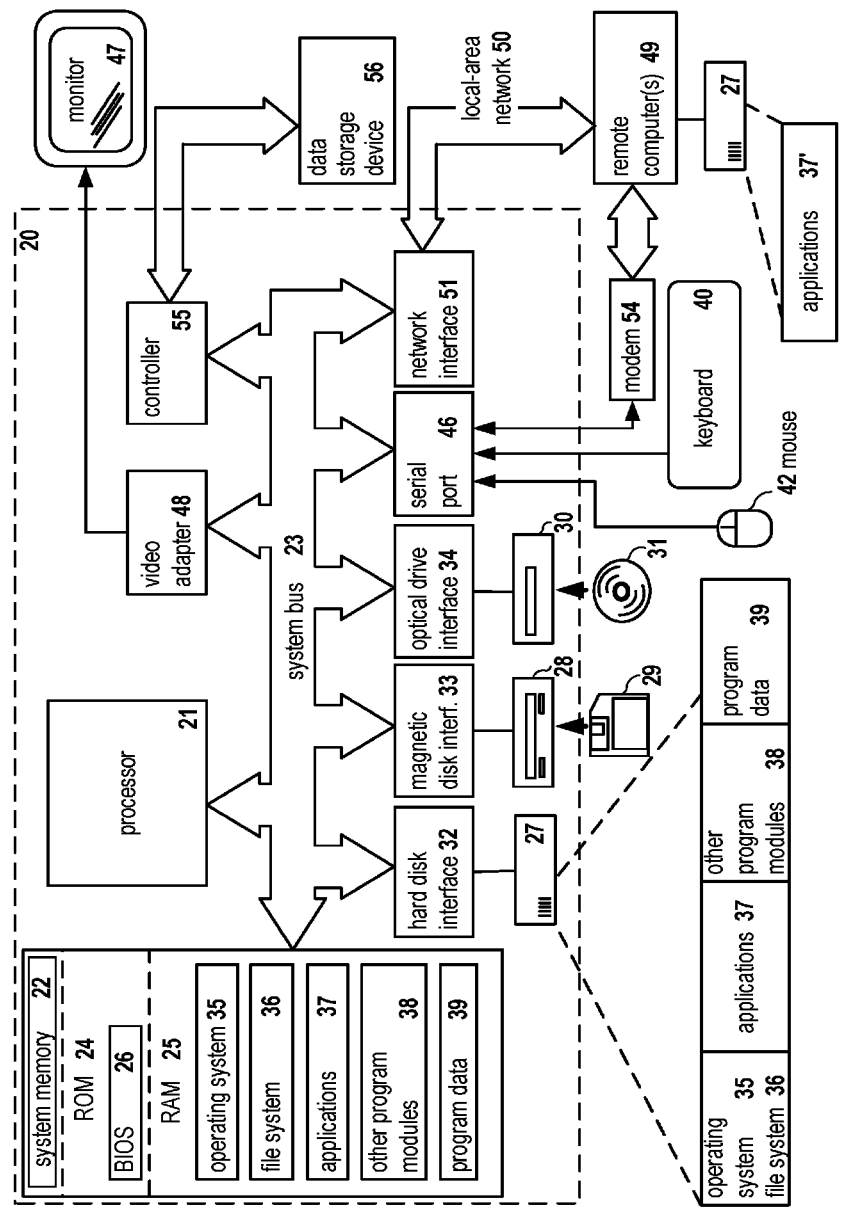
FIG. 5 presents an example of a general-purpose computer system on which aspects of the present disclosure can be implemented.

FIG. 5 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between modules of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned modules in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for transmitting data from a sending device to a receiving device, the method comprising:
  receiving, by a first logical object created for an application supported by the sending device, a request for a connection to the receiving device from the application supported by the sending device;
  establishing, by a second logical object created for the sending device, a bidirectional connection between a third logical object created for the sending device and a third logical object created for the receiving device;
  pre-processing, by the first logical object created for the sending device, data received from the application; and
  sending, by the first logical object created for the sending device, the data to the receiving device via the established bidirectional connection; wherein
  establishing the bidirectional connection comprises initiating a negotiation with a second logical object of the receiving device to obtain an assignment of Source Sequence Numbers (SSNs), the pre-processed data being transmitted using SSNs assigned by the second logical object of the receiving device, and each first logical object of the sending device being assigned a unique set of SSNs.

2. The method of claim 1, wherein
  the bidirectional connection is a connection of one or more connections established; and
  each of the one or more connections established is associated with a respective third logical object of a plurality of third logical objects, wherein the respective third logical object is configured to interact with an application programming interface (API) for the application running on the sending device and with a network component of a connection, of the one or more connections, associated with the respective third logical object.

3. The method of claim 2, wherein each respective third logical object is further configured to measure one or more performance parameters of the connection, associated with the respective third logical object.

4. The method of claim 1, further comprising:
prior to establishing the bidirectional connection, identifying, by the second logical object, a set of third logical objects associated with presently available network connections of a plurality of connections; and
selecting by the second logical object the third logical object from the set of third logical elements in dependence upon one or more performance parameters characterizing each presently available network connection of the plurality of connections between the sending device and the receiving device.

5. The method of claim 1, wherein prior to establishing the bidirectional connection the second logical object determines one or more performance parameters characterizing each connection of a plurality of connections between the sending device and the receiving device and selects the bidirectional connection in dependence upon the determined one or more performance parameters for each connection of the plurality of connections.

6. The method of claim 5, wherein the one or more performance parameters comprise at least some of response times, data transfer times, a Quality of Service, or a number of packets lost for at least some of the plurality of connections between the sending device and the receiving device.

7. The method of claim 1, further comprising:
prior to sending the data to the receiving device, obtaining, from the receiving device, one or more data identifiers configured to identify the sending device or the application running on the sending device as a source of the data.

8. The method of claim 1, wherein sending the data to the receiving device comprises performing, by the first logical object, at least one of packetizing the data, encrypting the data, or adding data recovery packets to the data.

9. The method according to claim 1, further comprising selecting, by the second logical object created for the sending device, one or more established bidirectional connections for transmitting the pre-processed data to the receiving device.

10. The method of claim 1, further comprising:
creating, by a processor of the sending device, one or more first logical objects, the second logical object, and one or more third logical objects, wherein, each first logical object of the one or more first logical objects created for the sending device is created for a particular application of one or more applications supported by the sending device, each third logical object created for the sending device is created for a particular network interface component of one or more network interface components of the sending device, and the second logical object created for the sending device comprises all of the third logical objects created for the sending device.

11. The method of claim 1, further comprising:
creating, by a processor of the receiving device, one or more first logical objects, a second logical object, and one or more third logical objects, wherein
each first logical object of the one or more first logical objects created for the receiving device is created for a particular application of one or more applications supported by the receiving device;
each third logical object created for the receiving device is for a particular network interface component of one or more network interface components of the receiving device; and
the second logical object created for the receiving device comprises all of the third logical objects created for the receiving device.

12. A method for transmitting data from a sending device to a receiving device, the method comprising:
receiving, by a first logical object created for an application supported by the sending device, a request for a connection to the receiving device from the application supported by the sending device;
establishing, by a second logical object created for the sending device, a bidirectional connection between a third logical object created for the sending device and a third logical object created for the receiving device;
pre-processing by the first logical object created for the sending device comprises:
receiving the data from the application associated with the first logical object;
packetizing the received data to obtain data packets;
encrypting the data packets; and
applying a data recovery mechanism on the encrypted data packets to obtain recoverable data packets; the recoverable data packets comprise a sequence of User Datagram Protocol (UDP) data packets, the sequence comprising the encrypted data packets and packets of the recovery mechanism; the data recovery mechanism applying a Forward Error Correction (FEC) mechanism on the encrypted data packets to obtain the recoverable data packets; and packets of the recovery mechanism comprise FEC data; and
sending, by the first logical object created for the sending device, the data to the receiving device via the established bidirectional connection.

13. A method for transmitting data from a sending device to a receiving device, the method comprising:
receiving, by a first logical object created for an application supported by the sending device, a request for a connection to the receiving device from the application supported by the sending device;
establishing, by a second logical object created for the sending device, a bidirectional connection between a third logical object created for the sending device and a third logical object created for the receiving device;
sending, by the first logical object created for the sending device, the data to the receiving device via the established bidirectional connection; and
processing, by a first logical object of one or more first logical objects created for the receiving device, the data received from the first logical object of the sending device, wherein
the processing of the received data comprises:
recovering data packets when at least one data packet is lost;
decrypting the received data when the received data packets are encrypted by the first logical object of the sending device; and providing the decrypted data packets to the application associated with the first logical object of the receiving device;

the first logical object of the receiving device receives the data from the first logical object of the sending device through a second logical object of the receiving device;

the second logical object of the receiving device identifies data flows directed to the first logical object based on Source Sequence Numbers (SSNs); and the SSNs were assigned by the second logical object of the receiving device.

\* \* \* \* \*